United States Patent
Nozaki et al.

(10) Patent No.: US 9,657,362 B2
(45) Date of Patent: May 23, 2017

(54) METHOD FOR IMPROVING DURABILITY OF EXHAUST PIPE

(71) Applicant: UD TRUCKS CORPORATION, Ageo-shi (JP)

(72) Inventors: Yoshihiko Nozaki, Ageo (JP); Jouji Hagiwara, Ageo (JP); Kazuhiro Hirakawa, Ageo (JP); Norihiro Fujisawa, Ageo (JP)

(73) Assignee: UD TRUCKS CORPORATION, Ageo-Shi (JP)

( * ) Notice: Subject to any disclaimer, the term of this patent is extended or adjusted under 35 U.S.C. 154(b) by 0 days.

(21) Appl. No.: 14/555,526

(22) Filed: Nov. 26, 2014

(65) Prior Publication Data

US 2015/0082776 A1 Mar. 26, 2015

Related U.S. Application Data

(63) Continuation of application No. PCT/JP2012/064051, filed on May 31, 2012.

(51) Int. Cl.
*B21D 31/06* (2006.01)
*C21D 7/06* (2006.01)
(Continued)

(52) U.S. Cl.
CPC ............ *C21D 7/06* (2013.01); *B21D 31/06* (2013.01); *B24C 1/10* (2013.01); *B24C 3/325* (2013.01);
(Continued)

(58) Field of Classification Search
CPC ... Y10T 29/479; Y10T 29/49345; C21D 7/06; B24C 1/10; B21D 31/06
See application file for complete search history.

(56) References Cited

U.S. PATENT DOCUMENTS

| 4,086,104 A * | 4/1978 | Kinoshita | C21D 7/04 148/325 |
| 2004/0013581 A1* | 1/2004 | Burnette | B01D 53/885 422/179 |

(Continued)

FOREIGN PATENT DOCUMENTS

| DE | 102008060151 A1 | 6/2010 |
| JP | S 56-131083 A | 10/1981 |

(Continued)

OTHER PUBLICATIONS

Japanese Office Action dated Nov. 10, 2015, which issued in Japanese Application No. 2014-518166, and partial English language translation.

(Continued)

*Primary Examiner* — Jermie Cozart
(74) *Attorney, Agent, or Firm* — McDermott Will & Emery LLP

(57) ABSTRACT

In an exhaust gas purification apparatus or other apparatuses that are supplied with ammonia generated from a urea aqueous solution and causes selective reduction and purification of nitride oxides, a shot peening treatment is applied to a welded portion of its exhaust pipe which is made of a ferritic stainless steel plate and through which exhaust gas containing ammonia and hydrogen passes. By shot peening the welded portion of the exhaust pipe, a tensile residual stress in the welded portion of the exhaust pipe can be replaced with a compressive residual stress, and further the diameter of metal crystal grains in the welded portion can be reduced. In this way, the durability of the exhaust pipe can be improved.

5 Claims, 7 Drawing Sheets

(51) Int. Cl.

| | | |
|---|---|---|
| *F01N 3/20* | (2006.01) | |
| *F01N 13/16* | (2010.01) | |
| *F01N 13/18* | (2010.01) | |
| *F01N 3/02* | (2006.01) | |
| *F01N 13/00* | (2010.01) | |
| *B24C 1/10* | (2006.01) | |
| *F01N 3/28* | (2006.01) | |
| *B24C 3/32* | (2006.01) | |
| *C21D 9/50* | (2006.01) | |

(52) U.S. Cl.
CPC ............... *C21D 9/50* (2013.01); *F01N 3/02* (2013.01); *F01N 3/208* (2013.01); *F01N 3/2066* (2013.01); *F01N 3/2892* (2013.01); *F01N 13/0097* (2014.06); *F01N 13/16* (2013.01); *F01N 13/18* (2013.01); *C21D 2211/005* (2013.01); *F01N 2450/22* (2013.01); *F01N 2530/04* (2013.01); *F01N 2610/02* (2013.01); *Y02T 10/24* (2013.01); *Y10T 29/479* (2015.01)

(56) References Cited

U.S. PATENT DOCUMENTS

| | | | | |
|---|---|---|---|---|
| 2006/0150384 A1* | 7/2006 | Labonte | ................ | B21C 37/045 29/407.01 |
| 2007/0065354 A1 | 3/2007 | Hemingway et al. | | |
| 2007/0144632 A1* | 6/2007 | Toyoda | ................ | C21D 8/0226 148/593 |
| 2007/0175204 A1 | 8/2007 | Shirai et al. | | |
| 2008/0072576 A1 | 3/2008 | Honda et al. | | |
| 2009/0071214 A1 | 3/2009 | Matsuo | | |
| 2010/0005787 A1 | 1/2010 | Hosoya et al. | | |
| 2011/0070134 A1 | 3/2011 | Stakhev et al. | | |
| 2014/0000330 A1* | 1/2014 | Hatou | ................... | B24C 7/0007 72/53 |

FOREIGN PATENT DOCUMENTS

| | | | | | |
|---|---|---|---|---|---|
| JP | 406050370 A | * | 2/1994 | | |
| JP | H6-096191 B2 | | 11/1994 | | |
| JP | EP 1029720 A2 | * | 8/2000 | ............. | B21C 37/06 |
| JP | 2001-198828 A | | 7/2001 | | |
| JP | EP 1243768 A2 | * | 9/2002 | ........... | F01N 3/2842 |
| JP | 2002303693 A | * | 10/2002 | | |
| JP | 2005-226528 A | | 8/2005 | | |
| JP | 2007-278232 A | | 10/2007 | | |
| JP | 2010-116619 A | | 5/2010 | | |
| JP | 2011-078968 A | | 4/2011 | | |
| WO | 2007/099949 A1 | | 9/2007 | | |

OTHER PUBLICATIONS

Extended European Search Report dated Apr. 19, 2016, which issued in European Patent Application No. 12878012.9.

* cited by examiner

METHOD FOR IMPROVING DURABILITY OF EXHAUST PIPE

CROSS-REFERENCE TO RELATED APPLICATION

This application is a continuation application of PCT/JP2012/064051, filed on May 31, 2012, which is hereby incorporated by reference in its entirety for all purposes.

BACKGROUND OF THE INVENTION

1. Field of the Invention

The present invention relates to a method for improving durability of an exhaust pipe, and relates to an exhaust gas purification apparatus.

2. Description of Related Art

As a catalytic purification system for removing nitrogen oxides (NOx) in exhaust gas of an engine, an exhaust gas purification apparatus disclosed in Japanese Laid-open (Kokai) Patent Application Publication No. 2005-226528 has been proposed. Such an exhaust gas purification apparatus supplies by injection a urea aqueous solution in accordance with an engine operation state on the exhaust gas upstream side of an SCR (selective catalytic reduction) converter disposed in an exhaust pipe, to thereby cause a selective reduction reaction between NOx and ammonia generated from the urea aqueous solution in the SCR converter, to purify the NOx into harmless components.

At least a part of an exhaust pipe of an engine may be made of a plate of ferritic stainless steel, such as SUS 436L, which is excellent in workability and weldability. In this case, the exhaust pipe is made up by shaping the ferritic stainless steel plate into a pipe form, butting its ends, and then welding the ends to each other.

The urea aqueous solution supplied by injection to the exhaust pipe of the engine is hydrolyzed using exhaust heat and vapor in the exhaust gas, thereby generating ammonia, hydrogen, and the like that have corrosiveness onto metal. A tensile stress may remain in the welded portion of the exhaust pipe due to the welding, so that stress cracking may easily occur therein, and further the diameter of metal crystal grains in the surface is increased by heat from the welding, so that the welded portion may become sensitive to the corrosive components.

For this reason, the durability of the welded portion of the exhaust pipe may be unfavorably reduced due to the exposure to an environment in which stress cracking may easily occur and due to a synergistic effect in combination of the tensile residual stress and the increase in sensitivity to corrosive components.

SUMMARY OF THE INVENTION

In one or more implementations, the subject technology provides a method for improving durability of an exhaust pipe, and an exhaust gas purification apparatus, which are capable of improving durability of a welded portion of the exhaust pipe.

A shot peening treatment is applied to a welded portion of an exhaust pipe which is made of a ferritic stainless steel plate and through which exhaust gas containing ammonia and hydrogen passes.

Since a tensile residual stress in the welded portion of the exhaust pipe can be replaced with a compressive residual stress, and further, since the diameter of metal crystal grains in the welded portion can be reduced, the durability of the exhaust pipe can be improved.

DESCRIPTION OF PREFERRED EMBODIMENTS

Hereinafter, with reference to the accompanying drawings, embodiments for carrying out the present invention will be described in detail.

Figure 1:
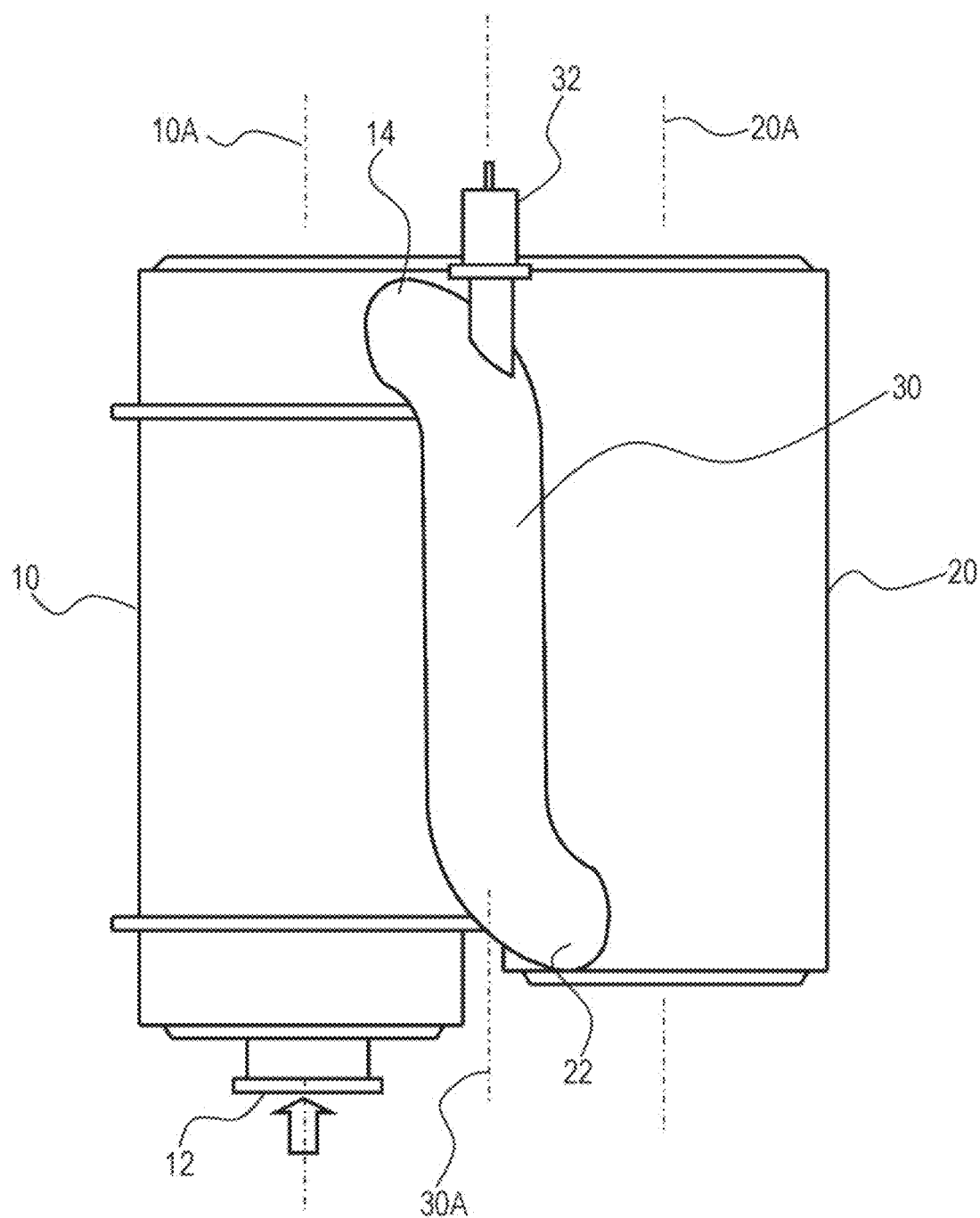
FIG. 1 is a plan view of an exhaust gas purification apparatus.
Figure 2:
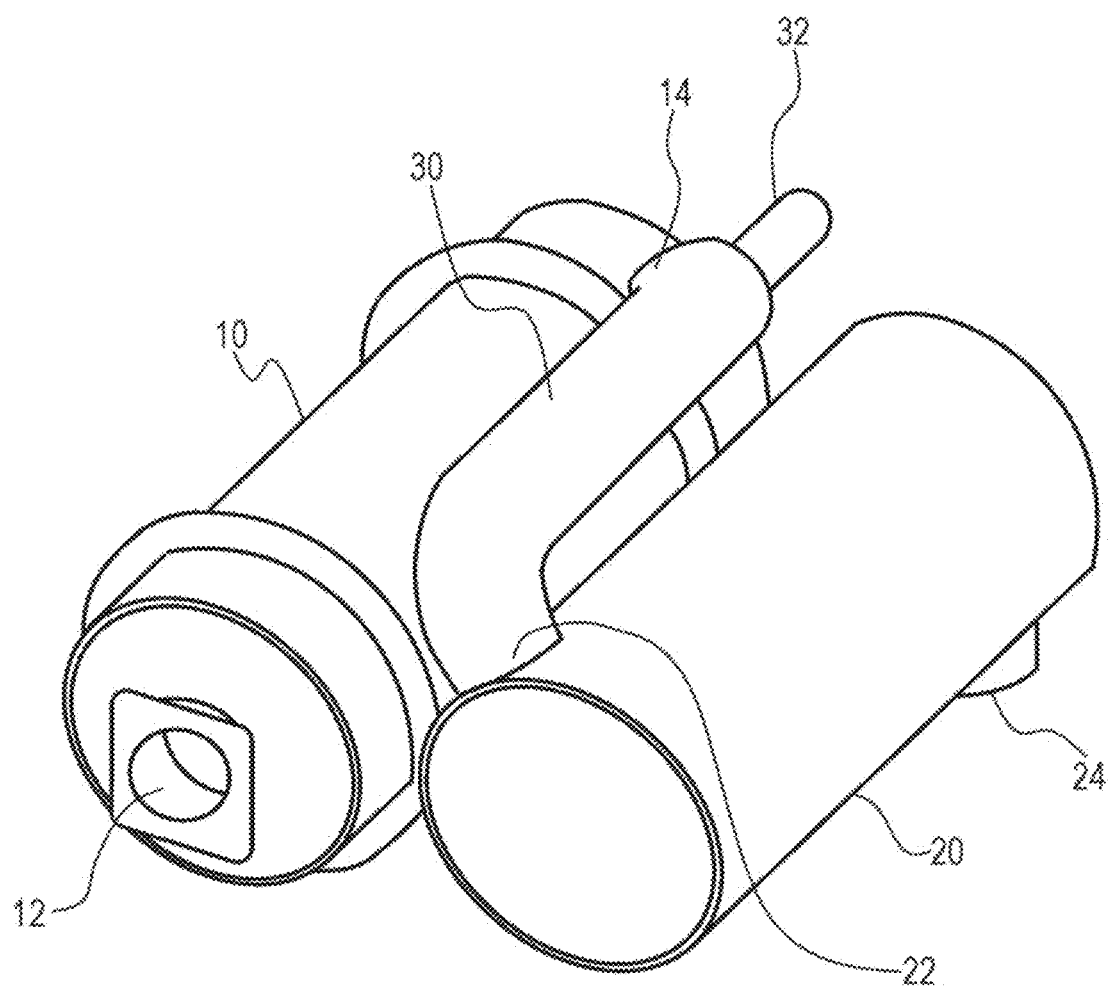
FIG. 2 is a perspective view of the exhaust gas purification apparatus.
Figure 3:
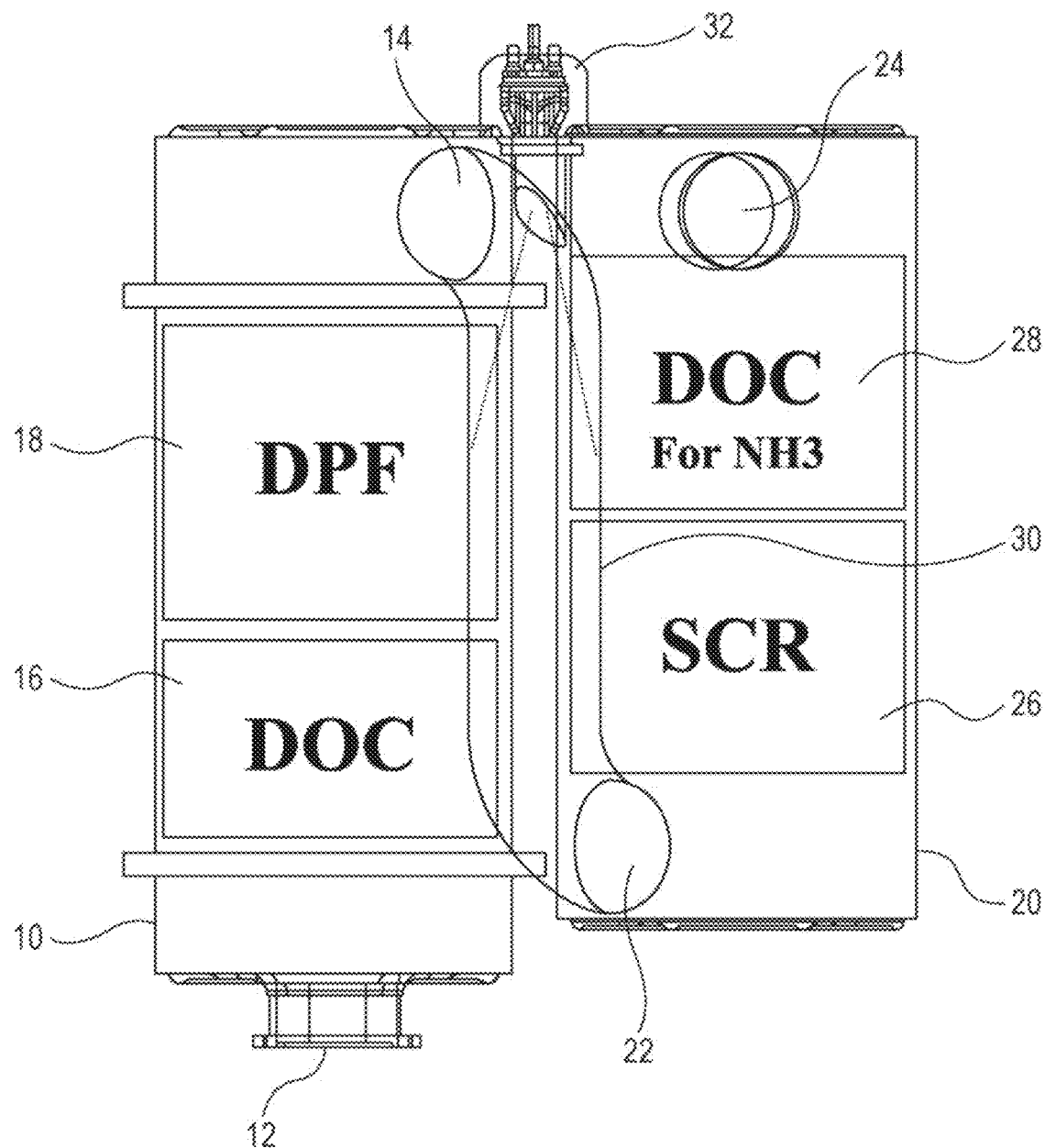
FIG. 3 is an explanatory view illustrating the inside of the exhaust gas purification apparatus.

FIGS. 1 to 3 illustrate an example of an exhaust gas purification apparatus.

The exhaust gas purification apparatus includes a first casing 10 having a tubular shape, a second casing 20 also having a tubular shape, and a communication pipe 30 by which far-end portions of the first casing 10 and the second casing 20 communicate with each other. The first and second casings 10 and 20 are arranged closely to each other to make an axis 10A of the first casing 10 and an axis 20A of the second casing 20 substantially parallel to each other (as used herein, "parallel" may be confirmed by measuring with the eyes). The communication pipe 30 is arranged to make an axis 30A of the communication pipe 30 substantially parallel to the axis 10A of the first casing 10 and the axis 20A of the second casing 20. The first casing 10, the second casing 20 and the communication pipe 30 correspond to a part of an exhaust pipe of an engine. The first casing 10, the second casing 20 and the communication pipe 30 are each made of a plate of ferritic stainless steel, such as SUS 436L, which is excellent in workability and weldability.

In the first casing 10, an inlet 12 is formed at the exhaust-gas upstream end thereof, and an outlet 14 is formed at the exhaust-gas downstream end thereof. In the present embodiment, the inlet 12 is formed in an end face of the exhaust-gas upstream end, and the outlet 14 is formed in a side face of the exhaust-gas downstream end. Between the inlet 12 and the outlet 14, a DOC (diesel oxidation catalyst) converter 16 for oxidizing at least NO (nitrogen monoxide) to $NO_2$ (nitrogen dioxide), and a diesel particulate filter (hereinafter referred to as "DPF") 18 for collecting and removing PMs (particulate matters) are disposed in a manner such that the DOC converter 16 is arranged on the exhaust-gas upstream side.

In the second casing 20, an inlet 22 is formed at the exhaust-gas upstream end thereof, and an outlet 24 is formed at the exhaust-gas downstream end thereof. In the present embodiment, the inlet 22 and the outlet 24 are formed in a side face of the respective ends of the second casing 20. Between the inlet 22 and the outlet 24, an SCR converter 26 (selective catalytic reduction converter) that is supplied with ammonia as a reducing agent and causes selective reduction and purification of NOx, and an oxidation catalyst converter 28 for oxidizing ammonia and hydrogen which have passed through the SCR converter 26 are disposed in a manner such that the SCR converter 26 is arranged on the exhaust-gas upstream side.

The communication pipe 30 communicates far-end portions of the first casing 10 and the second casing 20 with each other, that is, communicates the outlet 14 at the exhaust-gas downstream end of the first casing 10 and the inlet 22 at the exhaust-gas upstream end of the second casing 20, which are the end portions located opposite to and far from each other. Accordingly, the exhaust gas of the engine flows into the first casing 10 via the inlet 12, and passes through the DOC converter 16 and the DPF 18, and then, enters the communication pipe 30 via the outlet 14. The exhaust gas which has entered the communication pipe 30 passes through the communication pipe 30 and flows into the second casing 20 via the inlet 22. The exhaust gas passes through the SCR converter 26 and the oxidation catalyst converter 28, and then is discharged from the outlet 24. In other words, the passage of the exhaust gas from the first casing 10 to the second casing 20 through the communication pipe 30 is made to turn once by the communication pipe 30.

The communication pipe 30 is a linearly formed straight pipe having, at both ends thereof, bent portions for connecting the communication pipe 30 to the outlet 14 of the first casing 10 and to the inlet 22 of the second casing 20. An injection nozzle 32 is attached to the bent portion for the outlet 14. The injection nozzle 32 supplies by injection a urea aqueous solution toward an inside of the straight portion of the communication pipe 30. In this way, a length of the straight portion required to uniformly diffuse the urea aqueous solution in the exhaust gas can be obtained. In order to facilitate the uniform diffusion of the urea aqueous solution, for example, a known diffusing member, such as a mesh member, may be disposed in the communication pipe 30.

In the exhaust gas purification apparatus, the exhaust gas discharged from the engine flows to the DPF 18 while a part of NO is oxidized to $NO_2$ in the DOC converter 16. In the DPF 18, the PMs in the exhaust gas are collected and removed, and further a treatment for regenerating the DPF 18 is conducted by oxidizing the PMs using $NO_2$ produced by the DOC converter 16.

The urea aqueous solution injected from the injection nozzle 32 at a flow rate in accordance with an engine operation state is hydrolyzed using exhaust heat and vapor in the exhaust gas, and converted to ammonia, hydrogen and the like. It is known that ammonia selectively reduces NOx in the exhaust gas in the SCR converter 26, and is purified to $H_2O$ (water) and $N_2$ (nitrogen gas), which are harmless components. Ammonia and hydrogen that have passed through the SCR converter 26 are oxidized in the oxidation catalyst converter 28 arranged on the exhaust-gas downstream side thereof. Thus, ammonia and hydrogen can be prevented from being emitted, as they are, into the atmosphere.

Furthermore, since the first and second casings 10 and 20 are arranged to be close and parallel to each other, the size of the outline of the exhaust gas purification apparatus is as compact as that of a rectangular muffler. Since the aforementioned far-end portions of the first and second casings 10 and 20 communicate with each other through the communication pipe 30, the communication pipe 30 can be placed in the outline of the first and second casings 10 and 20 while the pipe length required to uniformly diffuse the urea aqueous solution can be obtained. Thus, the size in the length direction from the exhaust-gas upstream to the exhaust-gas downstream can be reduced.

Figure 4:
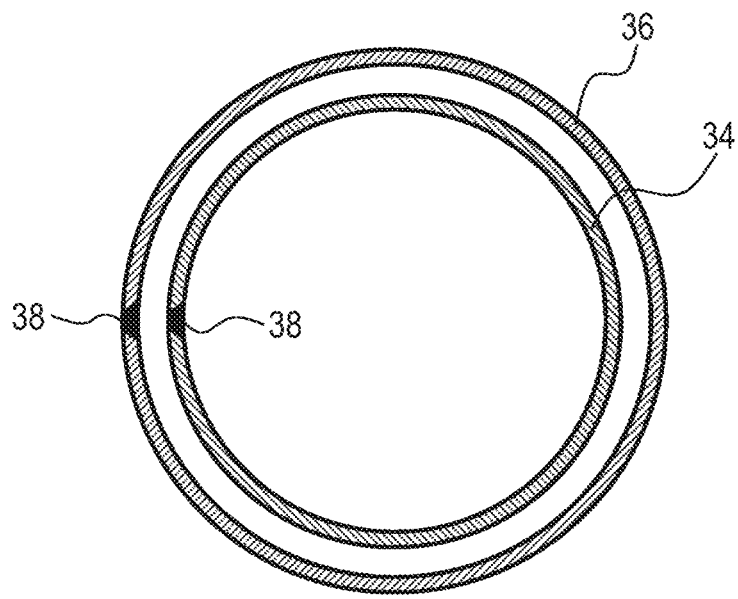
FIG. 4 is a cross-sectional view of an exhaust pipe having a double-pipe structure composed of an inner pipe and an outer pipe.

As illustrated in FIG. 4, the straight portion extending between the bent portions of the communication pipe 30, that is, at least a part of the exhaust pipe positioned between the injection nozzle 32 and the SCR converter 26 has a double-pipe structure composed of an inner pipe 34 and an outer pipe 36 arranged substantially concentrically, to improve the heat retaining performance of the communication pipe 30 and to facilitate, for example, the hydrolysis of the urea aqueous solution supplied by injection from the injection nozzle 32. For example, the inner pipe 34 and the outer pipe 36 are formed by shaping a plate made of ferritic stainless steel, such as SUS 436L, into a pipe form, and then by being welded by the TIG (tungsten inert gas) welding or the like, with the ends thereof butted on each other. Accordingly, the welded portions 38 of the inner pipe 34 and the outer pipe 36 extend along the axial direction of the inner pipe 34 and that of the outer pipe 36, respectively. In order to reduce an increase in the sensitivity to ammonia and hydrogen, each of the inner pipe 34 and the outer pipe 36 may be subjected to welding from the inner side thereof to make grain boundaries of the inner peripheral surface of the welded portion 38 fine and make that of the outer peripheral surface of the welded portion 38 coarse.

Figure 5:
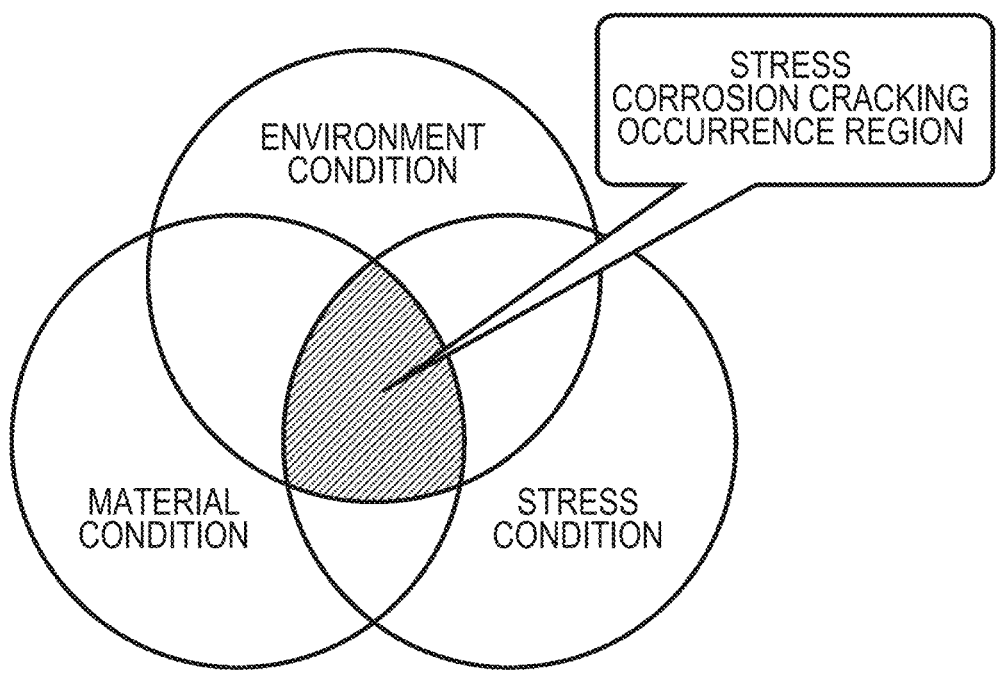
FIG. 5 is an explanatory view illustrating conditions in which durability of a welded portion decreases.

In the welded portion 38 of each of the inner pipe 34 and the outer pipe 36, a tensile stress of 100 MPa or more remains due to the welding, so that stress cracking may easily occur (stress condition is satisfied). Moreover, in the welded portion 38 of each of the inner pipe 34 and the outer pipe 36, the diameter of metal crystal grains in the surface thereof is increased by thermal influence at the time of welding, so that chromium (Cr) based carbide precipitates in boundaries between the crystal grains while the chromium (Cr) concentration in the surroundings of the boundaries decreases, resulting in an increase in sensitivity to ammonia and hydrogen (material condition is satisfied). Furthermore, in an exhaust passage formed between the inner pipe 34 and the outer pipe 36 and having a substantially annular transverse section, the flow of the exhaust gas is slower than in the inner space of the inner pipe 34, so that a period of time in which the welded portions 38 are exposed to ammonia and hydrogen may be increased (environment condition is satisfied). As illustrated in FIG. 5, therefore, when the environment condition, the material condition and the stress condition are simultaneously satisfied, the welded portions 38 of the inner pipe 34 and the outer pipe 36 come to be positioned in a region in which stress corrosion cracking may easily occur (stress corrosion cracking occurrence region). As a result, the durability of the welded portions 38 may unfavorably decrease. When the environment condition, the material condition and the stress condition are not simultaneously satisfied, the durability of the welded portions 38 does not very much decrease.

Figure 6:
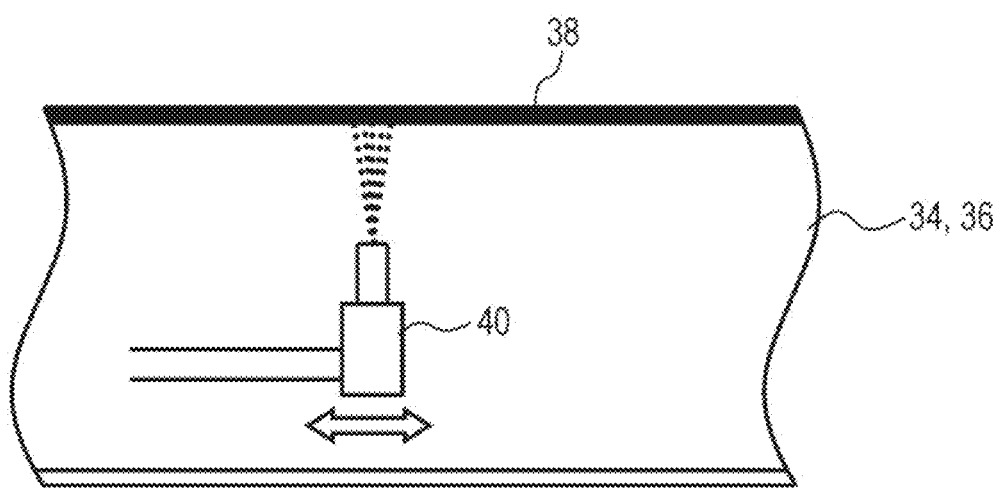
FIG. 6 is an explanatory view of a method for applying a shot peening treatment to the welded portion.

Thus, in order to prevent the material condition and the stress condition, out of the environment condition, the material condition and the stress condition, which cause the decrease in durability, from being satisfied, a shot peening treatment using steel balls is applied to the welded portions 38 of the inner pipe 34 and the outer pipe 36. That is, for each of the inner pipe 34 and the outer pipe 36, after the ferritic stainless steel plate is shaped into the pipe form and welded, the welded portion 38 is shot peened with the steel balls propelled out from a nozzle, to the welded portion 38 from respective inner sides of the inner pipe 34 and the outer pipe 36, while a shot peening device 40 is moved in the axial direction of the pipe, as illustrated in FIG. 6. Here, instead of moving the shot peening device 40, the inner pipe 34 and the outer pipe 36 may be moved in the axial direction. When the shot peening treatment is applied to the welded portions 38 of the inner pipe 34 and the outer pipe 36, the tensile residual stress in the welded portions 38 is replaced with a compressive residual stress, so that the stress condition, which is one of the causes of the decrease in durability, becomes unlikely to be satisfied. Furthermore, when the shot peening treatment is applied to the welded portions 38 of the inner pipe 34 and the outer pipe 36, since the surface of the welded portions 38 is impacted with the steel balls, the metal crystal grain diameter thereof can be reduced, and accordingly, the material condition, which is another cause of the decrease in durability, becomes unlikely to be satisfied. It is preferable to apply the shot peening treatment to, out of the inner surface and the outer surface of each of the inner pipe 34 and the outer pipe 36, at least the inner surface, which is more likely to be exposed to ammonia and hydrogen.

Accordingly, in the welded portions 38 of the inner pipe 34 and the outer pipe 36, the material condition and the tension condition, which are the causes of the decrease in durability, become unlikely to be satisfied, and thus, even when the welded portions 38 are exposed to ammonia and hydrogen, the welded portions 38 become unlikely to be positioned in the stress corrosion cracking occurrence region, so that the durability of the exhaust gas purification apparatus can be improved. In this case, the compressive residual stress decreases when the temperature becomes 600° C. However, the metal crystal grain diameter of the welded portions 38 is stable even at 600° C., so that the decrease in durability can be reduced even at high temperature.

If crystals of a metal different from the material of the inner pipe 34 and the outer pipe 36 are mixed into the welded portions 38 of the inner pipe 34 and the outer pipe 36, the metal crystal grain diameter of the surface of the welded portions 38 increases, so that the sensitivity of the welded portions 38 to ammonia and hydrogen increases. Thus, the material condition may be unfavorably satisfied. It is therefore preferable to use, in the shot peening treatment, stainless steel balls, the material of which is similar to that of the inner pipe 34 and the outer pipe 36. In the shot peening treatment, balls of ferritic stainless steel such as SUS 436L, that is, the same material as used in the inner pipe 34 and the outer pipe 36 may be used.

Figure 7:
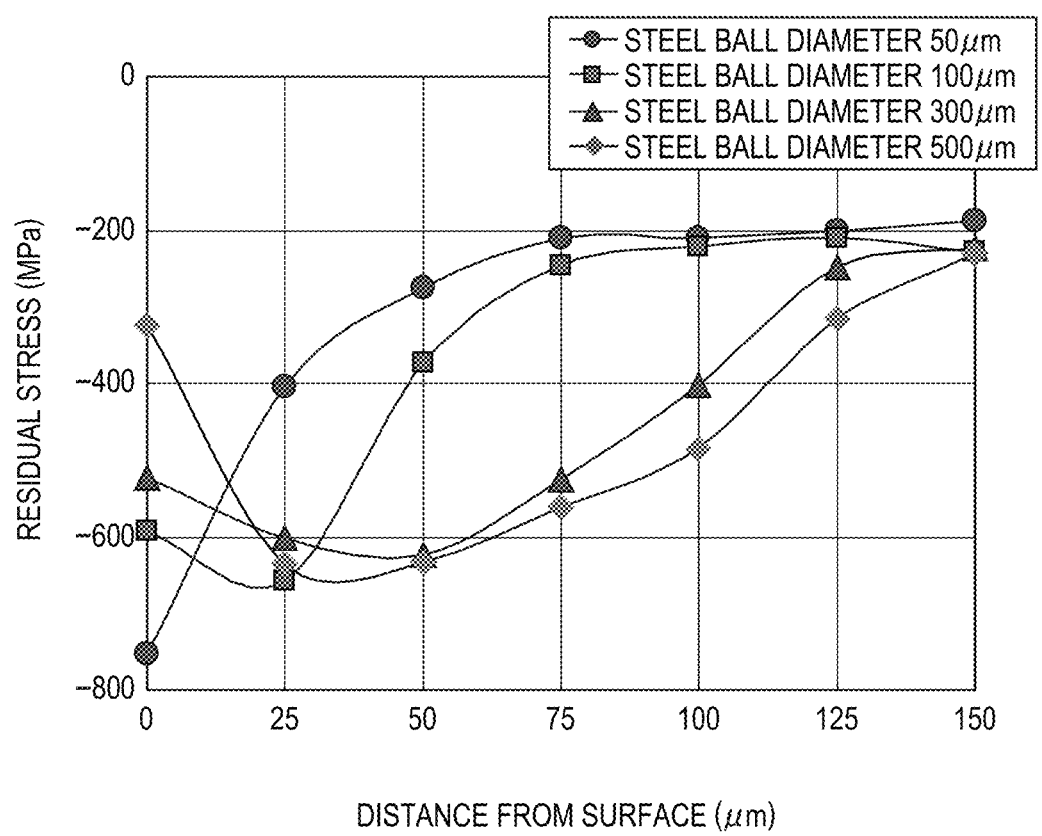
FIG. 7 is a diagram illustrating a correlation between the diameter of steel balls for the shot peening treatment and a compressive residual stress.
Figure 8:
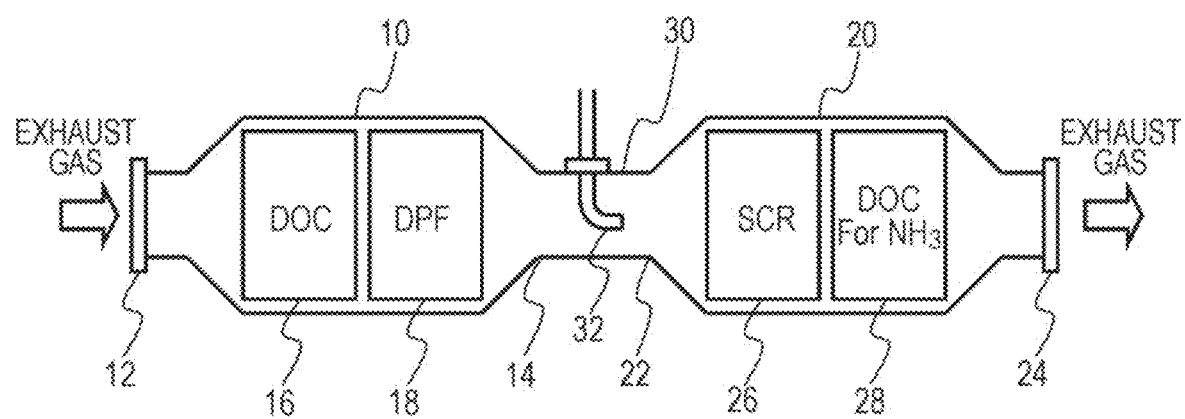
FIG. 8 is an explanatory view illustrating another example of the exhaust gas purification apparatus.

In the shot peening treatment applied to the welded portions 38 of the inner pipe 34 and the outer pipe 36, it is preferable to use steel balls having a diameter of 50 to 300 μm (0.05 to 0.3 mm), to reduce the diameter of the metal crystal grains in the surface of the welded portions 38 to achieve the desired advantageous effects. That is, since the decrease in durability occurs from the surface of the welded portions 38, the advantageous effects of the improvement in durability by the shot peening treatment depends on the compressive residual stress in the outermost surface of the welded portions 38. When ferritic stainless steel balls are propelled by high-pressure air or a gas having a pressure of 0.3 MPa or more, a relationship between the diameter of the steel balls and the compressive residual stress with respect to the distance from the surface is as illustrated in FIG. 7. Referring to FIG. 7, it is understood that as the diameter of the steel balls decreases, the maximum value of the compressive residual stress shifts more closely to the outermost surface, and as the diameter of the steel balls increases, the compressive residual stress in the outermost surface decreases due to plastic deformation, so that the maximum value of the compressive residual stress shifts inward. Therefore, a value of 50 to 300 μm may be selected as the diameter of the steel balls.

The diameter of the steel balls for use in the shot peening treatment may be appropriately selected so that the diameter of the metal crystal grains in the surface of the welded portions 38 of the inner pipe 34 and the outer pipe 36 becomes substantially equal to that of metal crystal grains in the material of the inner pipe 34 and the outer pipe 36.

Furthermore, the communication pipe 30 is not limited to the double-pipe structure composed of the inner pipe 34 and the outer pipe 36, and may be a single-pipe structure. In this case also, the material condition and the stress condition, which are the causes of the decrease in durability, become unlikely to be satisfied, so that the durability of the welded portions 38 can be improved.

The exhaust gas purification apparatus is not limited to the apparatus having the structure illustrated in FIGS. 1 to 3. As illustrated in FIG. 7, the exhaust gas purification apparatus may have a structure in which the first casing 10, the communication pipe 30 and the second casing 20 are arranged in this order and in a substantially straight form. The exhaust pipe to be improved in durability is not limited to the communication pipe 30, and may be another part to be exposed to ammonia and hydrogen.

It should be understood that many notifications and variations of the described embodiments of the invention will be apparent to a person having an ordinary skill in the art without departing from the spirit and scope of the present invention as claimed in the appended claims.

What is claimed is:

1. A method for improving durability of an exhaust pipe, comprising:
applying a shot peening treatment to a welded portion of the exhaust pipe which is made of a ferritic stainless steel plate and through which exhaust gas containing ammonia and hydrogen passes;
wherein stainless steel balls are used in the shot peening treatment, and the stainless steel balls are made of the same material as the exhaust pipe; and
wherein the exhaust pipe comprises an inner pipe and an outer pipe, the inner pipe and the outer pipe each being made of ferritic stainless steel and having a welded portion extending axially thereon.

2. The method for improving durability of an exhaust pipe according to claim 1, wherein the stainless steel balls each have a diameter of 50 to 300 μm.

3. The method for improving durability of an exhaust pipe according to claim 1, wherein the shot peening treatment is applied to, out of an inner peripheral surface and an outer peripheral surface of the welded portion of the exhaust pipe, at least the inner peripheral surface.

4. The method for improving durability of an exhaust pipe according to claim 1, wherein the shot peening treatment is applied to the welded portion of both the inner pipe and the outer pipe.

5. The method for improving durability of an exhaust pipe according to claim 1, wherein the exhaust gas passes in an annulus between the inner pipe and the outer pipe.

* * * * *